US012064974B2

(12) United States Patent
Shiba

(10) Patent No.: US 12,064,974 B2
(45) Date of Patent: Aug. 20, 2024

(54) LIQUID CONTAINER

(71) Applicant: CANON KABUSHIKI KAISHA, Tokyo (JP)

(72) Inventor: Akira Shiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 17/690,558

(22) Filed: Mar. 9, 2022

(65) Prior Publication Data

US 2022/0314632 A1 Oct. 6, 2022

(30) Foreign Application Priority Data

Mar. 30, 2021 (JP) ................................ 2021-058383

(51) Int. Cl.
*B41J 2/175* (2006.01)

(52) U.S. Cl.
CPC ....... *B41J 2/17566* (2013.01); *B41J 2/17553* (2013.01); *B41J 2/17513* (2013.01)

(58) Field of Classification Search
CPC .... B41J 2/175; B41J 2/17503; B41J 2/17509; B41J 2/17513; B41J 2/1752; B41J 2/17523; B41J 2/17553; B41J 29/13
See application file for complete search history.

(56) References Cited

U.S. PATENT DOCUMENTS 6,386,692 B1 * 5/2002 Cowger ............... B41J 2/17513 141/386
6,834,945 B2 * 12/2004 Ishizawa .............. B41J 2/17526 347/50
6,843,558 B2 * 1/2005 Seino .................. B41J 2/17513 347/85
7,086,722 B2 * 8/2006 Aruga .................. B41J 2/17509 347/86
7,384,133 B2 * 6/2008 Ishizawa .............. B41J 2/17513 347/85
8,083,335 B2 * 12/2011 Ishizawa .............. B41J 2/17513 347/85
10,427,412 B2 * 10/2019 Okude ................... B41J 2/1752
2002/0089576 A1 * 7/2002 Ishizawa .............. B41J 2/17566 347/86
2004/0134801 A1 * 7/2004 Shimizu ............... B41J 2/17533 206/213.1
2004/0201654 A1 * 10/2004 Morita ................ B41J 2/17513 347/86

(Continued)

FOREIGN PATENT DOCUMENTS

EP 1053874 A2 11/2000
EP 1088666 A1 4/2001

(Continued)

*Primary Examiner* — Anh T Vo
(74) *Attorney, Agent, or Firm* — Canon U.S.A., Inc., IP Division

(57) ABSTRACT

A liquid container to be mounted on a liquid discharge apparatus includes a casing, a pouch, and a spout. The pouch is removable and contained in the casing. The spout is connected to the pouch. The casing has a rigidity that is higher than a rigidity of the pouch. The pouch and the spout each have a dimension in a direction of gravity in a posture of the liquid container that is taken when the liquid container is mounted on the liquid discharge apparatus, and the dimension of the spout is less than or equal to half the dimension of the pouch.

11 Claims, 9 Drawing Sheets

(56) References Cited

U.S. PATENT DOCUMENTS

| | | | |
|---|---|---|---|
| 2006/0139420 | A1 | 6/2006 | Muranaka |

FOREIGN PATENT DOCUMENTS

| | | | |
|---|---|---|---|
| EP | 1749662 A2 | 2/2007 |
| EP | 2204288 A1 | 7/2010 |
| EP | 2292431 A1 | 3/2011 |
| EP | 2778203 A1 | 9/2014 |
| JP | 4380712 B2 | 12/2009 |

* cited by examiner

LIQUID CONTAINER

BACKGROUND

Field

The present disclosure relates to liquid containers.

Description of the Related Art

Some liquid discharge apparatuses, such as inkjet printers, incorporate a removable liquid container that stores liquid, such as ink. The liquid container mounted on such a liquid discharge apparatus supplies the liquid to a liquid discharge head. Japanese Patent No. 4380712 describes a replaceable ink cartridge, serving as a liquid container. Such an ink cartridge, which contains ink, supplies the ink to an inkjet head when mounted on an inkjet printer.

A liquid container like that described in Japanese Patent No. 4380712 typically includes mostly a plastic molded portion. Such a liquid container is often discarded when liquid contained in the container is used up.

An ink cartridge that has supplied all of ink contained therein to an inkjet printer is replaced by a new ink cartridge. The spent ink cartridge may be collected and reused or may be discarded without being collected.

As the impact of plastic waste on marine life has recently been pointed out, the amount of plastic waste is required to be minimized. A liquid container that contains liquid, such as ink, needs to be rigid to some extent to prevent leakage of the liquid or so that the liquid container can be readily mounted on a liquid discharge apparatus. A reduction in the amount of plastic used to form the liquid container tends to reduce the rigidity of the liquid container.

SUMMARY

According to an aspect of the present disclosure, a liquid container to be mounted on a liquid discharge apparatus includes a casing, a pouch that is removable and contained in the casing, and a spout connected to the pouch, wherein the casing has a rigidity that is higher than a rigidity of the pouch, and wherein the pouch and the spout each have a dimension in a direction of gravity in a posture of the liquid container that is taken when the liquid container is mounted on the liquid discharge apparatus, and the dimension of the spout is less than or equal to half the dimension of the pouch.

Further features of the present disclosure will become apparent from the following description of exemplary embodiments with reference to the attached drawings.

DESCRIPTION OF THE EMBODIMENTS

Embodiments of the present disclosure will be described below with reference to the drawings.

Figure 1:
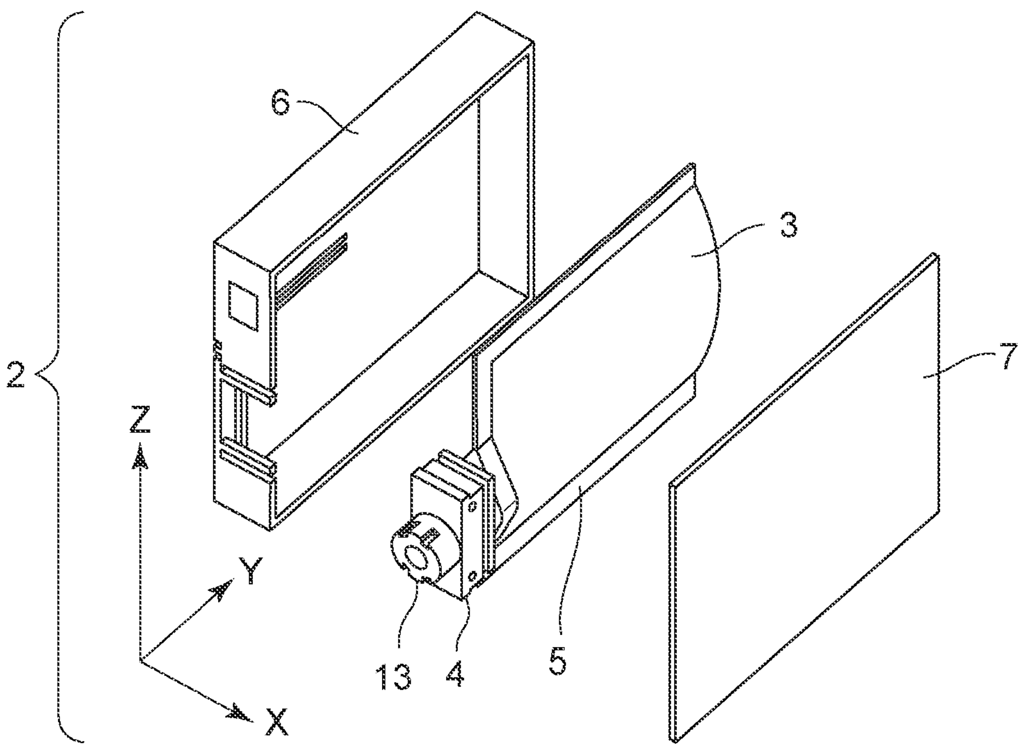
FIG. 1 is a schematic diagram of a liquid container.

FIG. 1 is a schematic diagram of an exemplary liquid container according to an embodiment of the present disclosure. A liquid container 2 mainly includes a casing 6 and a pouch 5. The casing 6 contains the pouch 5 and can be covered with a cover 7 as illustrated in FIG. 1. The pouch 5 mainly includes a liquid storing portion 3, which contains liquid. A spout 4 having a joint 13 is attached and connected to the liquid storing portion 3 of the pouch 5.

Figure 2:
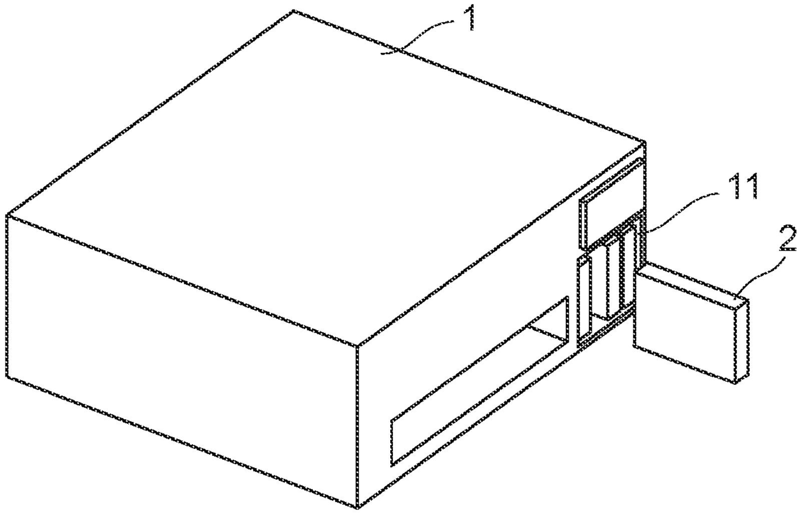
FIG. 2 is a schematic diagram of a liquid discharge apparatus.

FIG. 2 is a schematic diagram illustrating the liquid container 2 and a liquid discharge apparatus 1, onto which the liquid container 2 is mounted. The liquid discharge apparatus 1 includes a mounting portion 11, onto which the liquid container 2 is mounted. The liquid container 2 is inserted into the mounting portion 11, so that the liquid container 2 is mounted on the mounting portion 11. After mounted, the liquid container 2 supplies the liquid to a liquid discharge head (not illustrated) of the liquid discharge apparatus through the joint 13. The mounting portion 11 is divided into individual compartments, which can respectively receive the liquid containers 2. Each of the liquid containers 2 can be removed from the mounting portion 11 when the liquid container 2 contains little or no liquid because the liquid is used up.

As described above, the liquid container 2 is configured such that the casing 6 contains the pouch 5. The reason that the liquid container 2 has such a configuration will now be described. The pouch 5 is formed by a film. Examples of the film include a metallic film and a plastic film. If the pouch is formed by a plastic film, the plastic film for the pouch can be very thin, which indicates a very small amount of plastic used. In other words, such a pouch can contribute to less plastic usage or waste. However, it is difficult to stably mount the pouch 5 containing ink on the liquid discharge apparatus 1 because the pouch has low rigidity and is flexible. Therefore, the casing 6 having high rigidity is used, and the pouch 5 is contained in the casing 6. The film of the pouch 5 has a thickness of preferably from 0.1 to 1.0 mm. The casing 6 has a thickness of preferably 0.5 mm or more, more preferably from 1.0 to 5.0 mm.

More specifically, the pouch 5 is removable from the casing 6. The pouch 5 has the spout 4 attached thereto. The spout 4 is fitted into and attached to a receiving portion of the casing 6. The casing 6 is covered with the cover 7 and is then mounted on the liquid discharge apparatus 1.

To remove the pouch 5, the above procedure is reversed: the casing 6 is pulled out of the liquid discharge apparatus 1, the cover 7 is removed, and the pouch 5 is removed from the casing 6. When the pouch 5 is empty, a new pouch containing liquid is prepared and placed in the casing 6, from which the empty pouch has been removed. After that, as described above, the casing 6 is covered with the cover 7 as necessary.

According to the embodiment of the present disclosure, the casing 6 having high rigidity and made of, for example, plastic, is used. The casing 6 continues to be used, whereas the pouch 5 in the casing is replaceable.

Although the casing 6 is made of plastic, the casing 6 essentially continues to be used and thus can contribute to less plastic waste. If the pouch 5 is made of plastic, the amount of plastic used can be small. Replacement of such a part with a new one causes no significant increase in plastic waste. Furthermore, the casing 6 having sufficient rigidity enables the liquid container to be stably mounted on or removed from the liquid discharge apparatus 1.

The configuration of the liquid container 2 will now be described in more detail. The spout 4 is attached to the pouch 5. The spout 4 is made of resin material, such as polypropylene or polyethylene, and is connected or welded to the liquid storing portion 3 of the pouch 5 by a weld from a thermal welding process. The spout 4 can also have a size as small as possible in terms of less plastic usage. As used herein, the Z direction refers to the direction of gravity (height) in a posture of the liquid container 2 that is taken when the liquid container 2 is mounted on the liquid discharge apparatus, and the Y direction refers to a direction orthogonal to the Z direction. In FIG. 1, the Y direction is an insertion direction in which the liquid container is inserted into the liquid discharge apparatus, and corresponds to a longitudinal direction of the liquid container. As used herein, the X direction refers to a direction orthogonal to the Y direction and the Z direction, and corresponds to a lateral or widthwise direction of the liquid container.

The spout 4 has a dimension in the Z direction that is less than or equal to half that of the pouch. The spout 4 can have a size as small as possible in the Y direction. The spout 4 has a dimension in the Y direction that is less than or equal to half that of the pouch.

At a lower level in the direction of gravity, the spout 4 can increase the ease of discharge of the liquid in the pouch 5. Specifically, the spout 4 can be positioned such that the middle of the spout 4 in the Z direction is located at a level that is lower than A/2 in the direction of gravity, where A denotes the dimension of the pouch 5 in the Z direction.

The liquid storing portion 3 constitutes most of the pouch 5. The liquid storing portion 3, which is formed by a film, can be regarded as a pouch. The liquid storing portion 3 is made of, for example, a metallic film, a plastic film, or a combination of these films. The liquid storing portion 3 can have a gas-barrier property or a light-shielding property to protect liquid contained therein. The liquid storing portion 3 can be formed by a single film or a laminate of films. Examples of the metallic film include an aluminum film. If the liquid storing portion 3 is thermally welded to the spout 4, part of the liquid storing portion 3 that is thermally welded can be made of resin. For example, the liquid storing portion 3 can include an outer film made of aluminum and an inner film made of resin. The inner film can be thermally welded to the spout 4. The liquid storing portion 3 may be shaped like a three-sided seal bag, which is formed by welding peripheral parts of a film, or may be shaped like a standing pouch having a depth. The film forming the liquid storing portion 3 may be transparent or translucent so that the color of liquid contained in the liquid storing portion or the remaining amount thereof can be visually observed.

Figure 3:
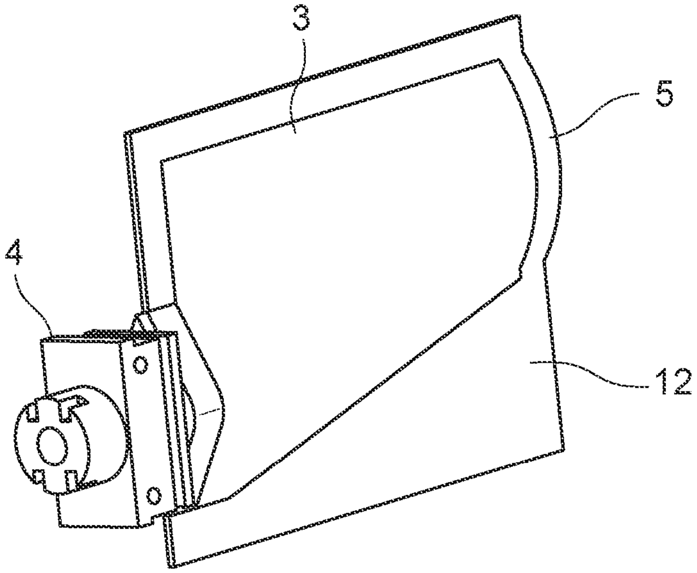
FIG. 3 is a schematic diagram of a pouch of the liquid container illustrating its exemplary configuration.

FIG. 3 is a schematic diagram of the liquid storing portion 3 of the pouch 5 illustrating its exemplary configuration. The pouch 5 of FIG. 3 is a bag including a welded portion 12, subjected to welding, extending around the periphery of the liquid storing portion 3. A lower part of the welded portion 12 in the direction of gravity has an upper edge sloping downward in the direction of gravity toward the spout 4 from a side remote from the spout 4. Such a configuration enables the contained liquid to be readily guided to the spout 4, thus enhancing the efficiency of usage of the liquid.

Figure 10:
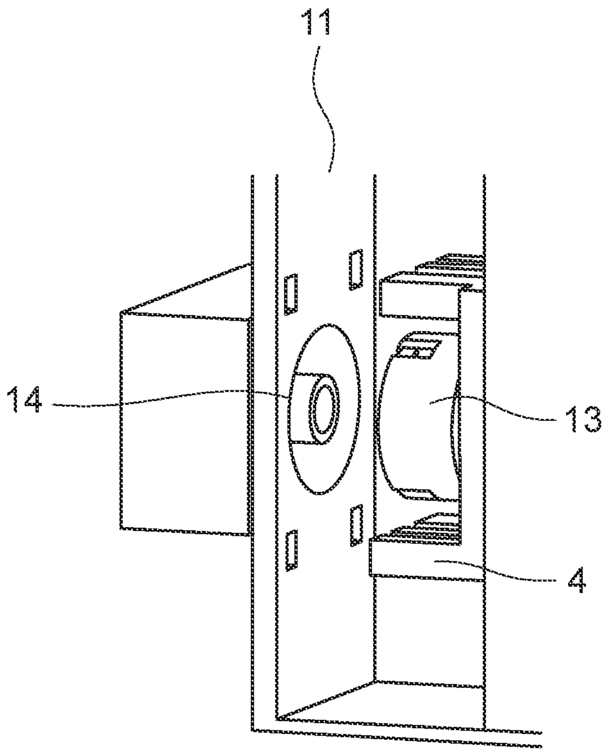
FIG. 10 is a schematic view of the liquid container illustrated as being mounted on the mounting portion.

The casing 6 will now be described. The casing 6 is made of a material having high rigidity. The casing 6 needs to be made of a material having a higher rigidity than at least a material for the pouch 5. The casing 6, which is used repeatedly as described above, can be made of plastic, such as polypropylene or polyethylene, or can be made of metal or carbon resin. The casing 6 having high rigidity facilitates mounting of the liquid container on the liquid discharge apparatus 1. FIG. 10 is a schematic enlarged view of part of the mounting portion 11 of the liquid discharge apparatus, and illustrates the liquid container as being mounted on the liquid discharge apparatus. The mounting portion 11 has a supply port 14, to which the joint 13 of the spout 4 is coupled. If the liquid container included only the pouch, it would be difficult to couple the joint 13 to the supply port 14 with a sufficient force because the container had low rigidity. Consequently, the liquid might fail to be successfully supplied. For this reason, the casing 6 having high rigidity and capable of bearing a load helps mounting of the liquid container, thus enabling the joint 13 of the spout 4 joined to the pouch in the casing 6 to be readily coupled to the supply port 14.

Figure 4:
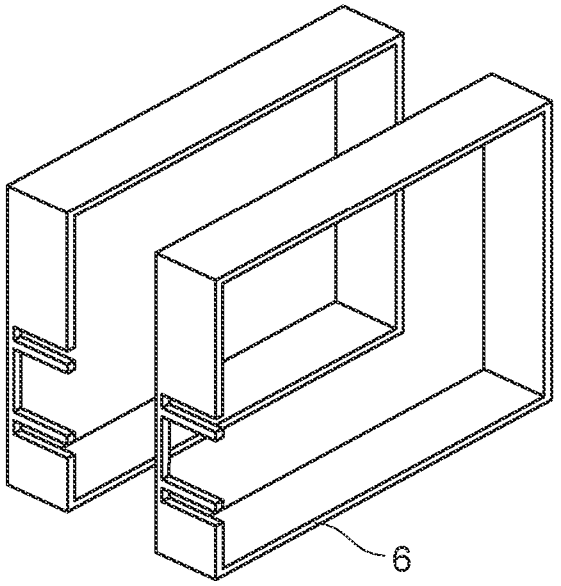
FIG. 4 is a schematic diagram of casings of the liquid containers.
Figure 5B:
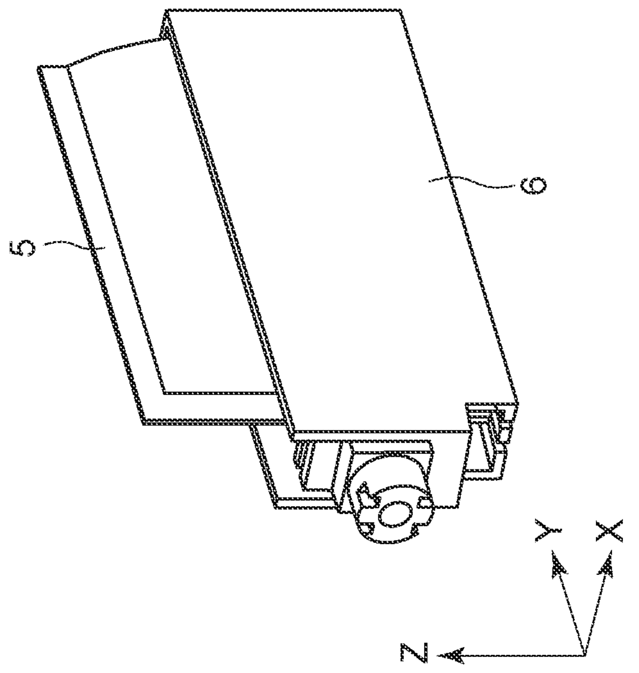
FIGS. 5A and 5B are schematic diagrams illustrating the casing and the pouch of the liquid container.
Figure 5A:
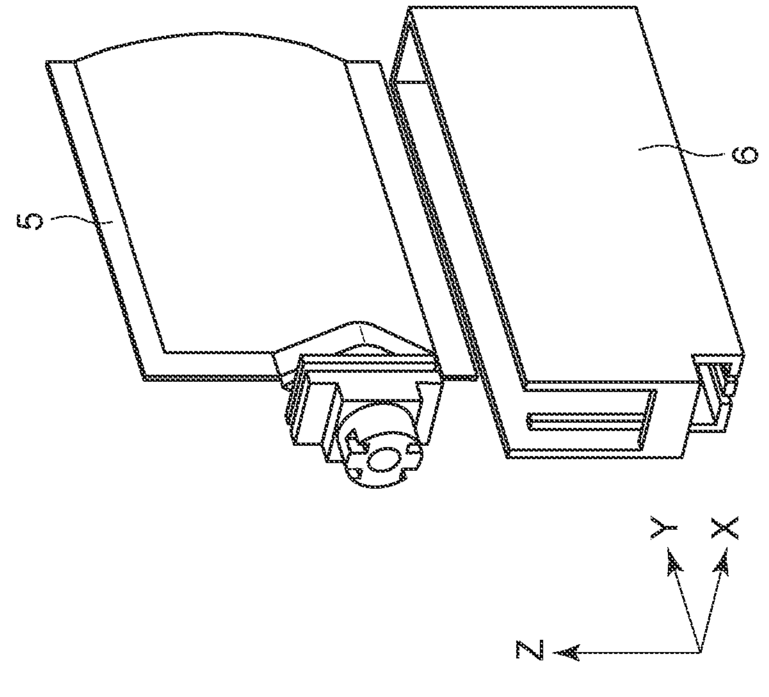

As illustrated in FIG. 1, after the pouch is inserted into and placed in the casing 6, an insertion opening of the casing 6 containing the pouch can be covered with the cover 7. The casing 6 can have a box shape having six faces when covered with the cover 7. The casing 6 may have any other shape. For example, an insertion opening, through which the pouch is inserted, may remain open. The casing 6 may have a box shape having five faces with no cover for the insertion opening. As illustrated in FIG. 4, the casing 6 may have a frame shape having four faces (or having two open faces). FIG. 4 illustrates two frame-shaped casings, in which different pouches are placed. When each of the pouches is placed in the corresponding one of the frame-shaped casings, opposite side faces of the pouch are exposed through respective openings of the casing. Furthermore, the casing 6 may be shaped as illustrated in FIGS. 5A and 5B. The casing 6 may have an opening, through which the pouch is inserted into the casing, located at an upper level in the direction of gravity.

Figure 6:
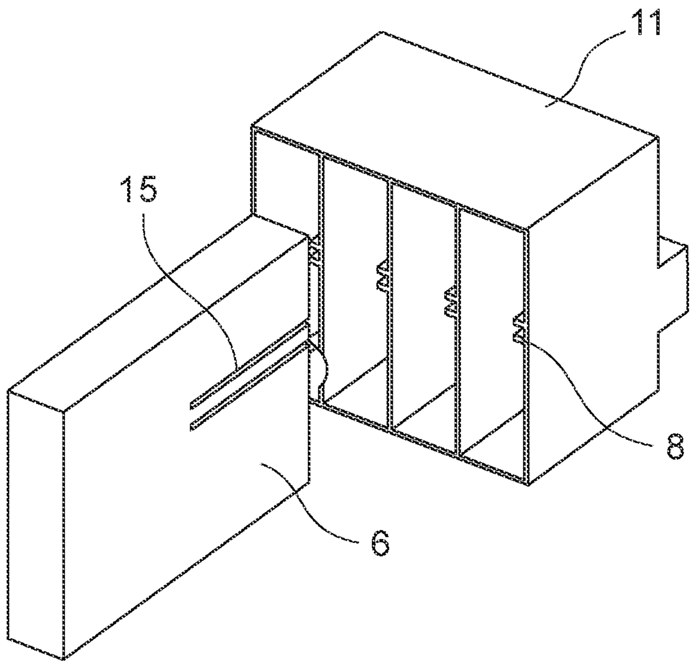
FIG. 6 is a schematic view of the liquid container illustrated as being mounted on a mounting portion.
Figure 7A:
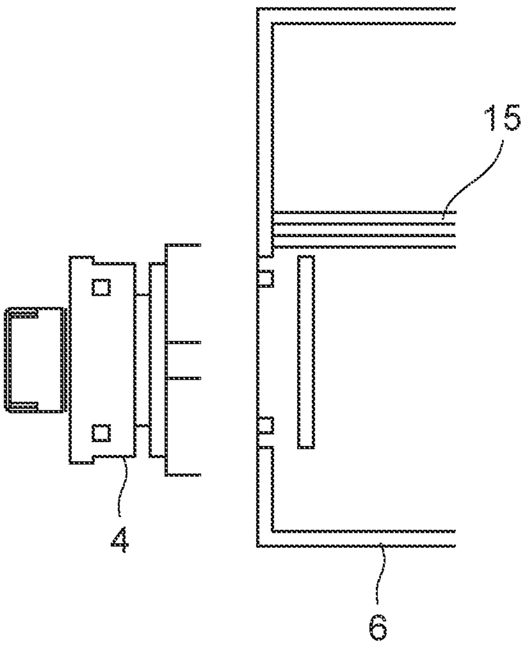
FIGS. 7A and 7B are schematic diagrams illustrating the casings and spouts of the liquid containers.
Figure 7B:
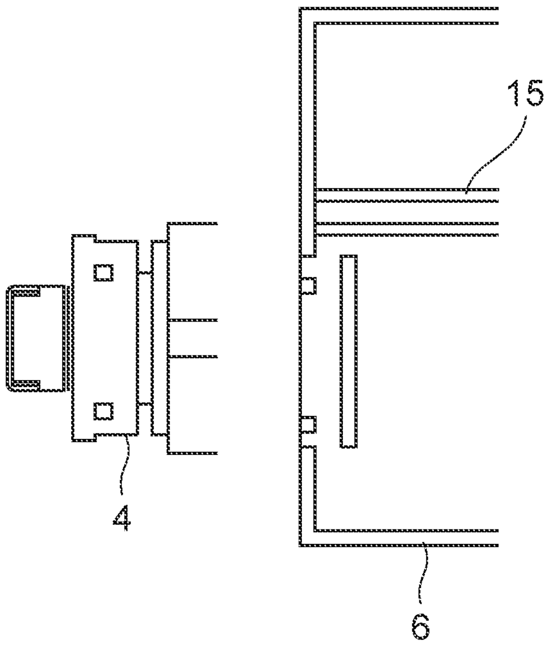

In a case where multiple liquid containers are mounted on the liquid discharge apparatus, the casings of the liquid containers may have different shapes. All of the casings do not have to be made different in shape from each other. At least two casings are made different in shape from each other. In this case, the mounting portion 11 can include a structure for each of the liquid containers in each of regions where the liquid containers are held. FIG. 6 illustrates the mounting portion 11 including ribs 8. The ribs 8 for four liquid containers are different in shape (arrangement pattern). The casing 6 has a groove 15 corresponding to the ribs 8. In such a configuration, when the liquid container is mounted at a correct location, the ribs 8 are fitted in the groove 15, so that the liquid container is successfully mounted. If the liquid container is mounted at an incorrect location, the ribs 8 will fail to be fitted in the groove 15, thus preventing incorrect mounting. FIGS. 7A and 7B illustrate relationships between the spouts 4 and the casings 6. The shape of the casing 6, particularly, the shape of the groove 15, in FIG. 7A differs from that in FIG. 7B. The structure of the spout 4 corresponding to the casing 6 in FIG. 7A also differs from that in FIG. 7B. FIGS. 7A and 7B illustrate the correspondence between the structures of the spouts 4 and the structures of the casings 6. As long as the structure of the spout 4 matches the structure of the casing 6, the spout and the pouch can be attached to the casing 6, thus preventing mismatch between the spout and the casing.

Figure 8:
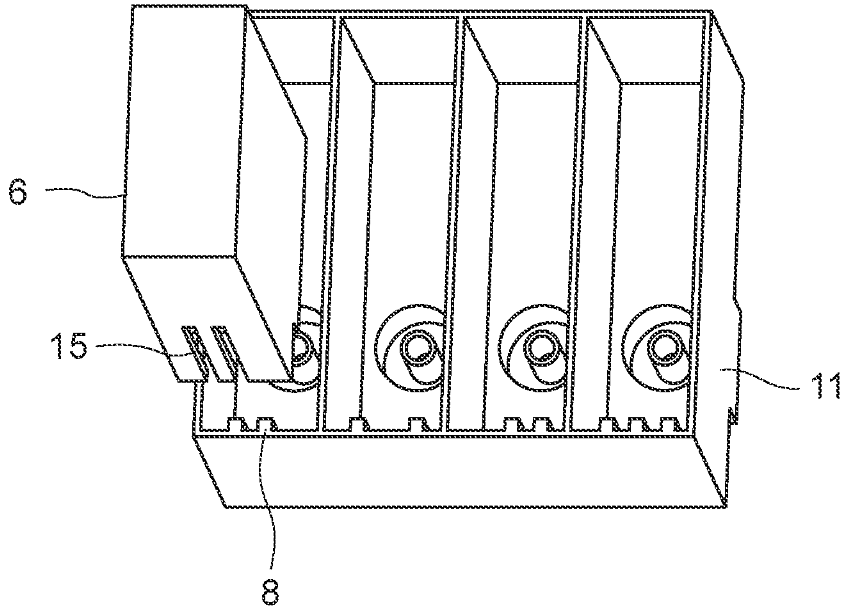
FIG. 8 is a schematic view of the liquid container illustrated as being mounted on the mounting portion.

If different shaped casings are used for the liquid containers, as illustrated in FIG. 8, the casings 6 may have different shaped grooves 15 in lower portions, and the mounting portion 11 may include the ribs 8 corresponding to the respective grooves.

Figure 9:
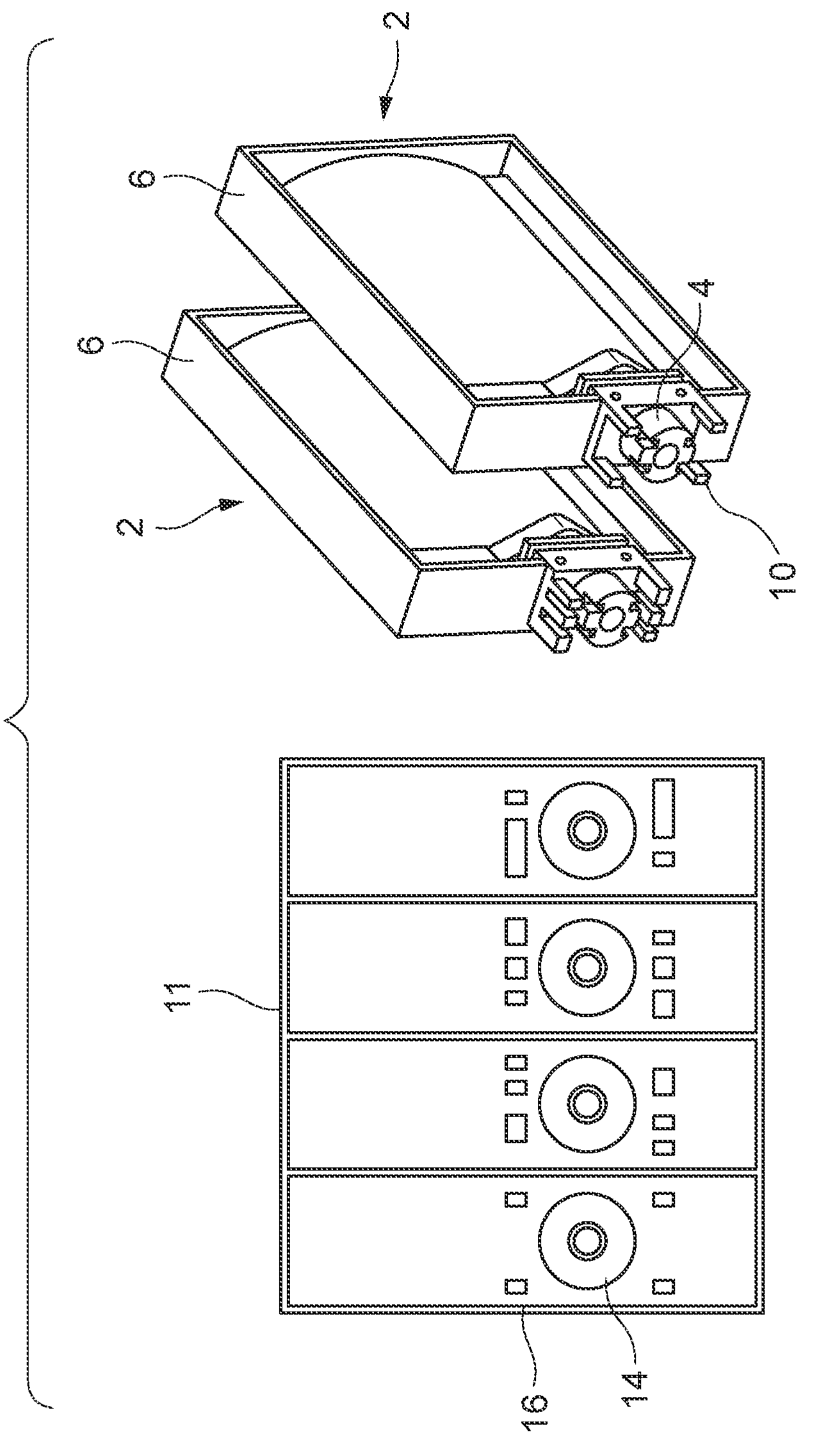
FIG. 9 is a schematic diagram illustrating the mounting portion and the liquid containers.

Considering the productivity of the casings, the casings having the same shape may be used for the liquid containers to be mounted on the liquid discharge apparatus. In this case, each of the spouts of the liquid containers can include an incorrect-mounting preventing mechanism. If the casings slightly differ from each other due to a manufacturing error, the casings can be regarded as having the same shape. FIG. 9 illustrates the mounting portion 11 and the shapes of the liquid containers 2. The spouts 4 of the liquid containers 2 each include protrusions 10. The casings 6 of the liquid containers 2 have the same shape, whereas the protrusions 10 of the liquid containers 2 differ from each other. In FIG. 9, the protrusions of the spouts differ in number and size. The mounting portion 11 has recesses 16 around the supply ports 14. If the liquid container is mounted at a correct location, for example, if the liquid container containing cyan ink is mounted on a mounting section for cyan, the protrusions 10 can be fitted in the recesses 16, so that the liquid container can be successfully mounted. If the liquid container is mounted at an incorrect location, for example, if the liquid container containing magenta ink is mounted on the mounting section for cyan, the protrusions cannot be fitted in the recesses, so that the liquid container will fail to be mounted.

For the fit between the protrusions and the recesses, the arrangement of the protrusions and the recesses, for example, where the protrusions are arranged and where the recesses are arranged, is not limited to the above example. The protrusions and the recesses can be appropriately arranged so as to be suitable for the shape of, for example, the liquid discharge apparatus 1, the liquid container 2, or the spout 4.

The fit between the mounting portion and the liquid container in any configuration is intended to prevent the liquid in the liquid container mounted at an incorrect location from accidentally entering the liquid discharge apparatus. To avoid such an accident, the liquid container 2 can be prevented from being inserted into the mounting portion 11 before the joint 13 of the liquid container 2 comes into contact with the supply port 14 of the mounting portion 11. Therefore, as illustrated in FIG. 10, the spout 4 can be projected farther than the joint 13 in the insertion direction, or the Y direction, for the fit between the liquid discharge apparatus 1 and the spout 4.

If the liquid discharge apparatus 1 is activated to discharge liquid under conditions where the liquid container 2 is partially mounted on the mounting portion 11, air may enter a passage in the liquid discharge apparatus. After that, the liquid discharge apparatus may fail to discharge liquid accurately. To recover the liquid discharge apparatus from such a state, for example, a large amount of liquid may be discharged to remove the air in the passage. Disadvantageously, the large amount of liquid may be wasted. To determine whether the casing 6 is fully mounted on the liquid discharge apparatus 1, a board can be incorporated in the casing 6 or the spout 4 and be effectively used. The board incorporated in the spout 4 can be brought into electrical communication with, for example, an electrode on the liquid discharge apparatus 1 when the liquid container 2 is fully mounted on the mounting portion 11 of the liquid discharge apparatus 1. As long as the liquid discharge apparatus 1 is allowed to discharge the liquid upon determination of the electrical communication, the above-described disadvantage can be addressed.

To mount the liquid container on the liquid discharge apparatus, the liquid container is inserted into the liquid discharge apparatus in the Y direction, which is illustrated in FIGS. 1, 5A, and 5B, in the examples illustrated in FIGS. 2 and 6. For this reason, displacement of the spout 4 relative to the casing 6 in the Y direction can be minimized in the liquid container. Therefore, the pouch 5 can be inserted into the casing 6 in the X direction or the Z direction. For example, FIGS. 5A and 5B illustrate the configuration in which the pouch 5 is inserted into the casing 6 in the Z direction. Furthermore, the pouch 5 can be fixed in the Y direction when placed in the casing 6.

As described above, the spout 4 can be positioned at a lower level in the direction of gravity. The spout 4 may be positioned at the bottom of the pouch 5 located at a lower level in the direction of gravity. In this case, the liquid container is inserted into the liquid discharge apparatus in the Z direction. Therefore, the displacement of the spout 4 relative to the casing 6 in the Z direction can be minimized. For example, the pouch 5 can be inserted into the casing 6 in the X direction or the Y direction. Furthermore, the pouch 5 can be fixed in the Z direction when placed in the casing 6.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-058383 filed Mar. 30, 2021, which is hereby incorporated by reference herein in its entirety.

What is claimed is:

1. A plurality of liquid containers to be mounted on a liquid discharge apparatus, each liquid container of the plurality of liquid containers comprising:

a casing;

a pouch that is detachable from and attachable to and contained in the casing; and a spout connected to the pouch, wherein the casing has a rigidity that is higher than a rigidity of the pouch, wherein the pouch and the spout each have a dimension in a direction of gravity in a posture of the liquid container that is taken when the liquid container is mounted on the liquid discharge apparatus, and the dimension of the spout is less than or equal to half the dimension of the pouch, wherein the casings of at least two of the spouts of at least two of the plurality of liquid containers have different shapes, and wherein the spouts of the plurality of liquid containers have different shapes corresponding to structures included in a mounting portion of the liquid discharge apparatus, and the plurality of liquid containers are mounted on the mounting portion when the shapes of the plurality of spouts match the structures of the mounting portion.

2. The plurality of liquid containers according to claim 1, wherein the pouch includes a metallic film.

3. The plurality of liquid containers according to claim 2, wherein the metallic film is aluminum.

4. The plurality of liquid containers according to claim 1, wherein the spout is connected to the pouch by a weld from a thermal welding process.

5. The plurality of liquid containers according to claim 1, wherein the casing includes plastic.

6. The plurality of liquid containers according to claim 1, wherein the casing includes a lid to cover an opening of the casing containing the pouch, and has a box shape having six faces.

7. The plurality of liquid containers according to claim 1, wherein the casing has a frame shape having four faces, and opposite side faces of the pouch contained in the casing are exposed through openings of the casing.

8. The plurality of liquid containers according to claim 1, wherein the spout is positioned such that a middle of the spout in the direction of gravity is located at a level that is lower than A/2 in the direction of gravity, where A denotes the dimension of the pouch in the direction of gravity in the posture of the liquid container taken when the liquid container is mounted on the liquid discharge apparatus.

9. The plurality of liquid containers according to claim 1, wherein the casings of the plurality of liquid containers have different shapes corresponding to structures included in a mounting portion of the liquid discharge apparatus, and the plurality of liquid containers are mounted on the mounting portion when the shapes of the plurality of casings match the structures of the mounting portion.

10. The plurality of liquid containers according to claim 1, wherein the casings of the plurality of liquid containers have the same shape, and the spouts of at least two of the plurality of liquid containers have different shapes.

11. The plurality of liquid containers according to claim 1 wherein the pouch is insertable into the casing in the direction of gravity or a direction orthogonal to an insertion direction and the direction of gravity.

* * * * *